No. 875,002. PATENTED DEC. 31, 1907.

W. H. SELLEW.
VALVE FOR STAND PIPES.
APPLICATION FILED DEC. 4, 1905.

2 SHEETS—SHEET 1.

Witnesses
C. W. Miles,
A. McCormack.

Inventor
William H. Sellew
By Walter F. Murray
Attorney

No. 875,002. PATENTED DEC. 31, 1907.
W. H. SELLEW.
VALVE FOR STAND PIPES.
APPLICATION FILED DEC. 4, 1905.

2 SHEETS—SHEET 2.

Witnesses
C. W. Miles.
A. McCormack.

Inventor
William H. Sellew
By Walter F. Murray
Attorney

UNITED STATES PATENT OFFICE.

WILLIAM H. SELLEW, OF DETROIT, MICHIGAN.

VALVE FOR STAND-PIPES.

No. 875,002.  Specification of Letters Patent.  Patented Dec. 31, 1907.

Application filed December 4, 1905. Serial No. 290,049.

*To all whom it may concern:*

Be it known that I, WILLIAM H. SELLEW, a citizen of the United States of America, and resident of Detroit, county of Wayne, and State of Michigan, have invented certain new and useful Improvements in Valves for Stand-Pipes, of which the following is a specification.

Figure 1:
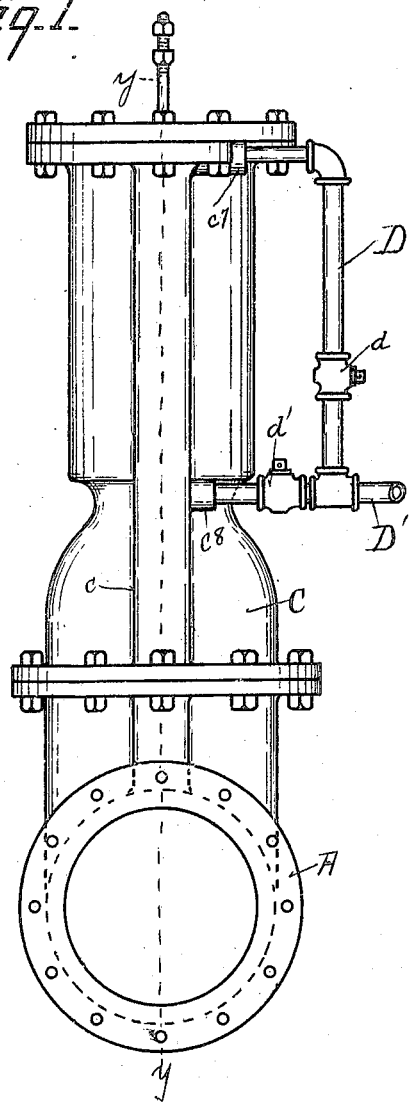
Figure 2:
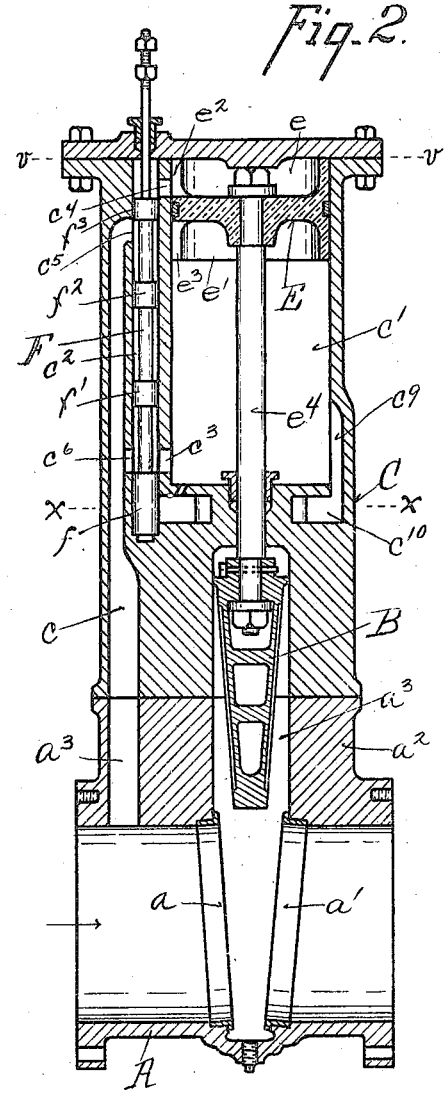
Figure 4:
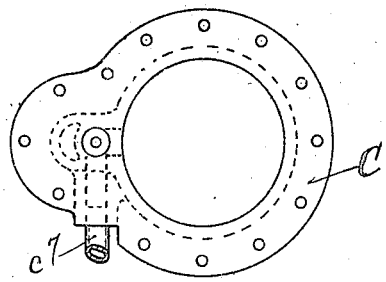
Figure 3:
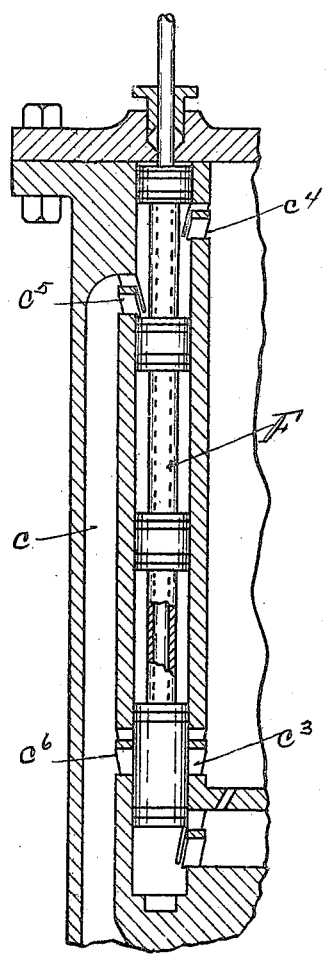
Figure 5:
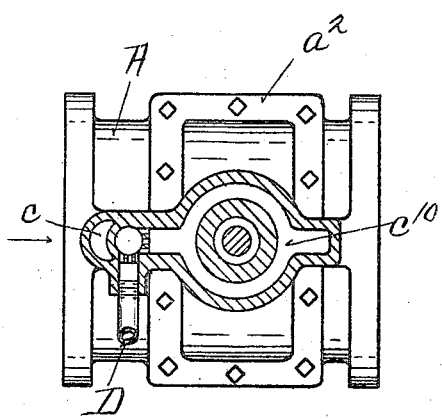

The object of my invention is a valve for regulating the flow of water from stand pipes into locomotive tanks, which may be opened rapidly to allow a full and unrestricted flow of water from the valve, which will come gradually to its seat to prevent water hammer, and which is provided with a ready means for regulating the rapidity of the movements of the valve. This object is attained by the means described in the specification, specifically set forth in the claims, and illustrated in the accompanying drawings, in which, Figure 1 is a side elevation of a stand pipe valve embodying my invention. Fig. 2 is a sectional view taken upon line $y$—$y$ of Fig. 1. Fig. 3 is a detail sectional view of a modified form of auxiliary piston. Fig. 4 is a sectional plan view upon line $v$—$v$ of Fig. 2. Fig. 5 is a similar view upon line $x$—$x$ of Fig. 2.

Referring to the parts: The housing consists of a hollow cylindrical section, A, located within which at the same acute angle to the longitudinal axis of the cylinder are two circular rings, $a$, $a'$, forming the seats for the gate valve, B, the faces of which are inclined to each other at the same angle as are the valve seats, $a$, and $a'$. Cylinder, A, has an upward annular extension, $a^2$, to which is attached a cylindrical housing, C, which has a chamber to register with the chamber, $a^3$, within which the gate-valve, B, reciprocates, and a water channel, $c$, to register with channel, $a^3$. Housing C, has within it a pressure chamber, $c'$, upon the side of which is located an auxiliary chamber, $c^2$. Auxiliary chamber, $c^2$, communicates with chamber, $c'$, by means of admission ports, $c^3$ and $c^4$, and communicates with the water channel, $c$, by means of ports, $c^5$ and $c^6$. Auxiliary chamber, $c^2$, has at its upper and lower ends respectively, ports, $c^7$ and $c^8$, connected with the exhaust pipes, D, D'. Within cylinder, $c'$, is located a piston, E, which has upper and lower annular flanges, $e$, and $e'$, said flanges having slots, $e^2$, and $e^3$, to register with the ports, $c^3$, and $c^4$, at the respectively upper and lower positions of the piston. Piston, E, is connected by a valve stem, $e^4$, with the gate valve, B. The lower end of the chamber, $c'$, has an elongated port, $c^9$, connected with an annular chamber, $c^{10}$, beneath the chamber, $c'$, and connected with the exhaust, $c^8$. Within the auxiliary chamber, $c^2$, is located an auxiliary slide valve, F, which has four collars, $f$, $f'$, $f^2$ and $f^3$, which fit the walls of the auxiliary chamber, $c^2$, snugly. In the lowermost position of the slide valve, F, collar, $f$, cuts off chamber, $c^{10}$, from the exhaust, $c^8$, and puts opening, $c^3$, in communication with the fluid under pressure in channel, $c$, and collar, $f^3$, stands below port, $c^4$, putting the upper end of the chamber, $c'$, into communication with the exhaust and cutting it off from the fluid under pressure. In the upper position of the slide valve, F, collar, $f^3$, stands above port, $c^4$, and covers exhaust, $c^7$, so that the upper end of the chamber, $c'$, is in communication with the fluid under pressure, and the collar, $f$, uncovers exhaust, $c^8$, and covers port, $c^3$, cutting off the lower end of the chamber, $c'$, from the fluid under pressure and putting it in communication with the exhaust.

In the modification shown in Fig. 3, the collars, $f$, $f'$, $f^2$ and $f^3$, are provided with split rings for making a snug fit within the chamber, $c^2$, and ports, $c^3$, $c^4$, $c^5$, and $c^6$ in the housing of the chamber, $c^2$, are made at an angle to the horizontal, to prevent the split rings from catching or spreading into them.

The valve, F, is to be coupled to a lever or other means of moving it manually. When the valve, B, is seated, the valve, F, is in its uppermost position. When it is desired to open the gate-valve, B, the slide valve, F, is thrown to its lowermost position such as shown in Fig. 2. In this position it is seen that the upper end of the pressure chamber is in communication with the exhaust and the fluid under pressure is admitted beneath piston, E, which is thrown quickly to its uppermost position carrying the gate-valve B, clear of the fluid channel, so that there is an unrestricted flow of the fluid under pressure through the valve. This is especially advantageous in stand pipes, since it is desired to fill tanks of locomotive engines as quickly as possible. When the desired amount of fluid has been admitted into the tank, the slide valve, F, is thrown to its upmost position. This puts the lower end of the pressure chamber, $c'$, in communication with the exhaust, and places the upper end in communication with the fluid under pressure, which then carries the piston, E, downward, taking the gate valve, B, toward its seat, as it approaches which, flange, $e'$, gradually covers the exhaust port, $c^9$, and thus causes the gate valve to settle to its seat gradually, so that the flow of the fluid through the valve is cut off gradually and thus any water hammer is obviated. The rapidity with which the fluid escapes at each of the exhausts, $c^7$, and $c^8$, may be regulated by means of stop-cocks, $d$, $d'$, located in the pipes, D, and D', respectively.

What I claim is:

1. In a valve construction for stand pipes the combination of a cylindrical housing having a longitudinal channel for fluid under pressure, a gate-valve for intercepting the channel, a second housing secured to the said cylindrical housing and containing a pressure chamber and an auxiliary chamber located at the side of the pressure chamber the pressure chamber having ports at its upper and lower ends leading into the auxiliary chamber and at its lower end an elongated port communicating with the exhaust, the auxiliary chamber having at its upper end a port leading to the exhaust and communicating near its upper and lower ends with the fluid under pressure, a slide-valve located in the auxiliary chamber and having collars thereon which put the upper end of the pressure chamber alternately into communication with the fluid under pressure and with the exhaust and the lower end into communication with the fluid under pressure, a piston within the pressure chamber with a flange which gradually closes the exhaust at the lower end of said chamber, and a means for connecting the gate-valve and the piston.

2. In combination with a gate-valve to be interposed in a channel for conveying fluid under pressure, the combination of a housing containing a pressure chamber and an auxiliary chamber, the auxiliary chamber having ports putting it into communication with the fluid under pressure and with an exhaust, the exhaust, the pressure chamber having ports connecting it with the auxiliary chamber, a valve in the auxiliary chamber for putting the opposite ends of the pressure chamber alternately in communication with the fluid under pressure and with the exhaust respectively, a piston within the pressure cylinder, means for connecting the piston and the gate-valve, and an automatic means operated by the piston for gradually choking the exhaust as the gate-valve approaches its seat.

WILLIAM H. SELLEW.

Witnesses:
S. N. WELSH,
H. M. SCHAEFER.